United States Patent [19]

Erickson

[11] 4,413,306

[45] Nov. 1, 1983

[54] TAMPER PREVENTION HOUSING FOR A WATT-HOUR METER AND OVERLOAD PROTECTED SWITCH

[75] Inventor: Reuben A. Erickson, Park Ridge, Ill.

[73] Assignee: Erickson Electrical Equipment Company, Park Ridge, Ill.

[21] Appl. No.: 501,749

[22] Filed: Jun. 9, 1983

Related U.S. Application Data

[63] Continuation of Ser. No. 401,848, Jul. 26, 1982, abandoned, which is a continuation-in-part of Ser. No. 314,687, Oct. 26, 1981, abandoned.

[51] Int. Cl.³ ............................................. H02B 9/00
[52] U.S. Cl. .................................. 361/361; 361/358; 361/368; 361/372
[58] Field of Search ............. 174/52 R; 361/331, 334, 361/346, 347, 353, 355–358, 360, 361, 363–366, 368, 369, 372

[56] References Cited

U.S. PATENT DOCUMENTS

| | | | |
|---|---|---|---|
| 3,458,768 | 7/1969 | Schubert | 361/366 |
| 3,691,288 | 9/1972 | Sturdivan | 361/357 |
| 3,707,653 | 12/1972 | Coffey | 361/365 |
| 3,717,805 | 2/1973 | Gnaedinger | 361/357 |
| 3,906,295 | 9/1975 | Tessmer | 361/356 |

*Primary Examiner*—G. P. Tolin
*Attorney, Agent, or Firm*—Kinzer, Plyer, Dorn & McEachran

[57] ABSTRACT

A tamper prevention housing assembly for mounting on a standard panelboard chassis, enclosing at least one watt-hour meter and its overload-protected switch arranged in a secure sequence between the bus bars of the panelboard chassis and the output terminal lugs of the switch. A first security partition divides the housing into a meter compartment and a switch compartment; the partition has an opening formed that is closed by a security panel fastened from the meter compartment side. A first set of bus connectors electrically connect the bus bars to the meter socket; a second set of connectors electrically connect the meter socket to the switch, through the opening in the security partition. A removable, lockable panel closes the front of the meter compartment, whereas a separate lockable door covers the front of the switch compartment. The entire housing is located substantially within the lateral confines of the panelboard

4 Claims, 10 Drawing Figures

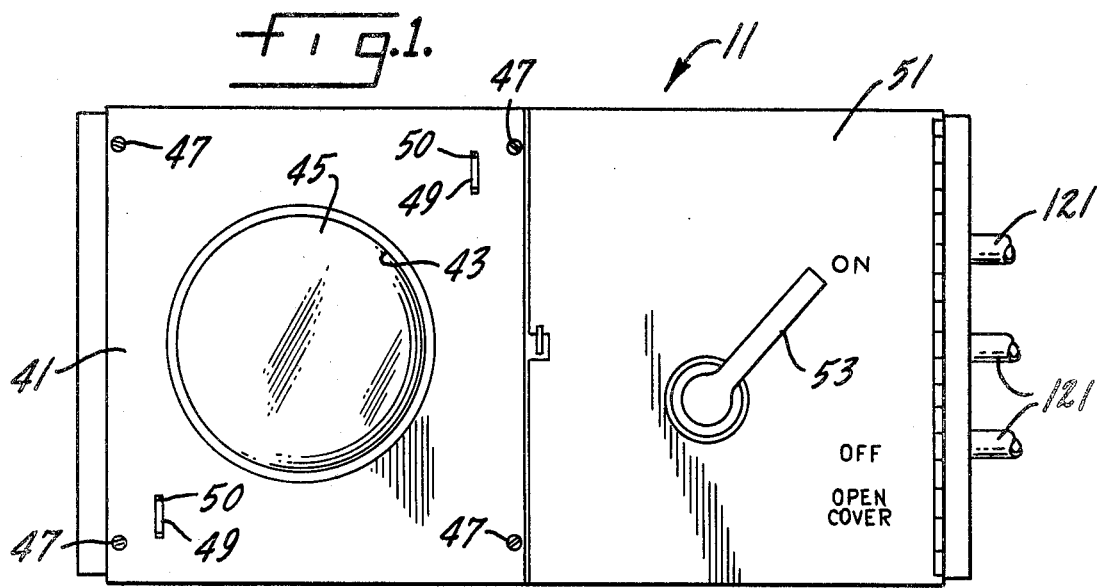
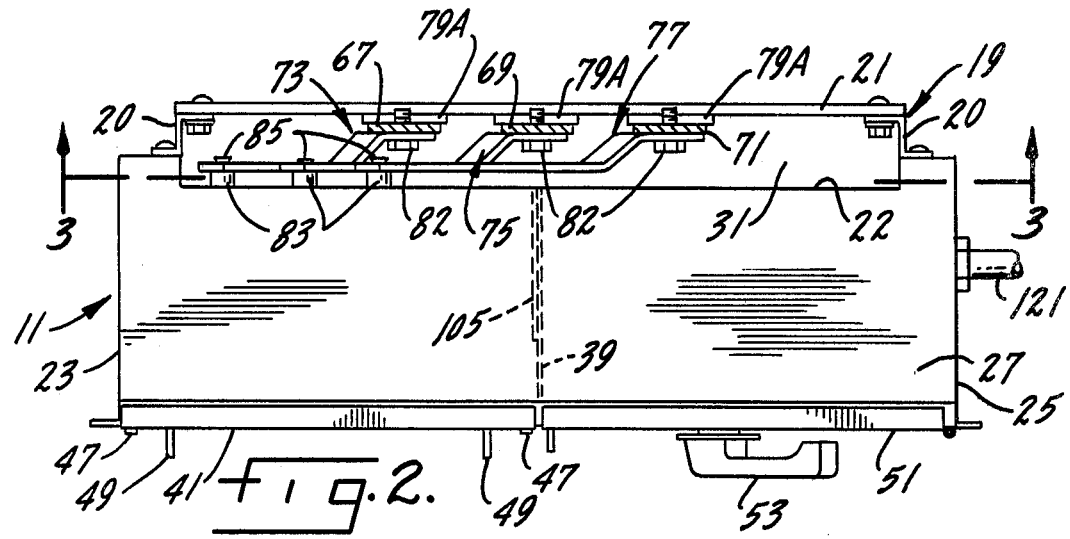
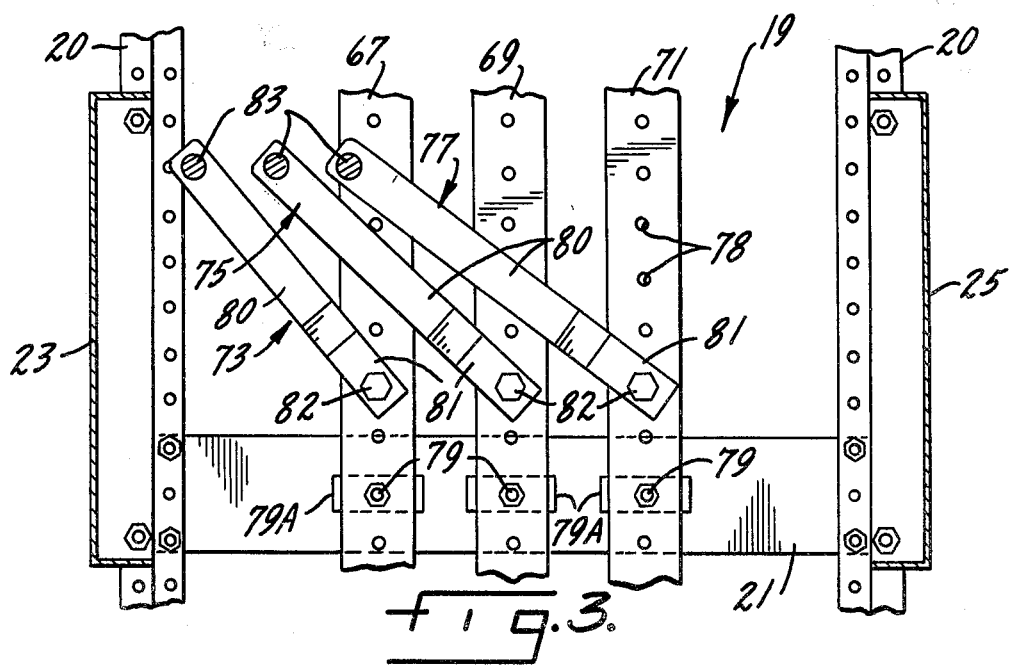

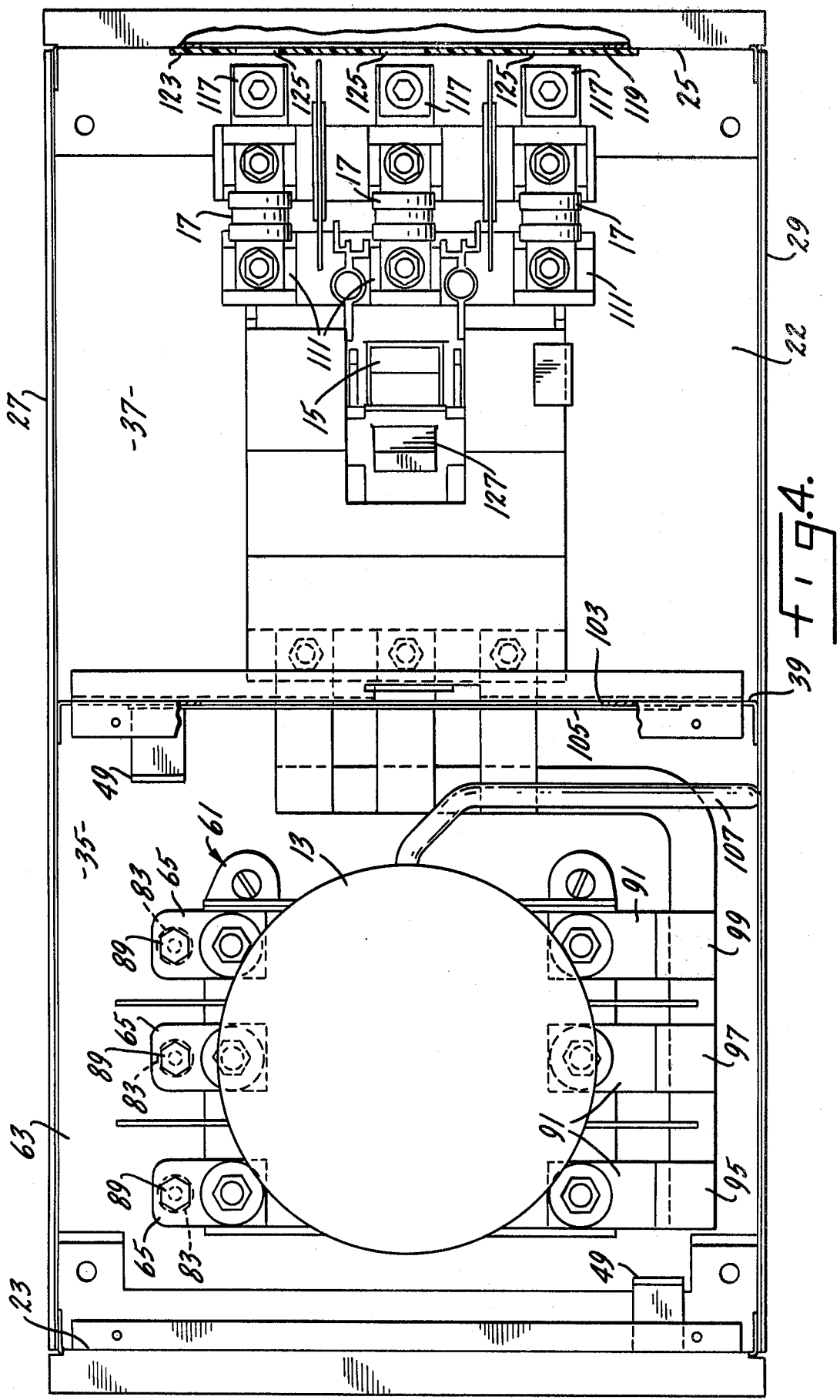

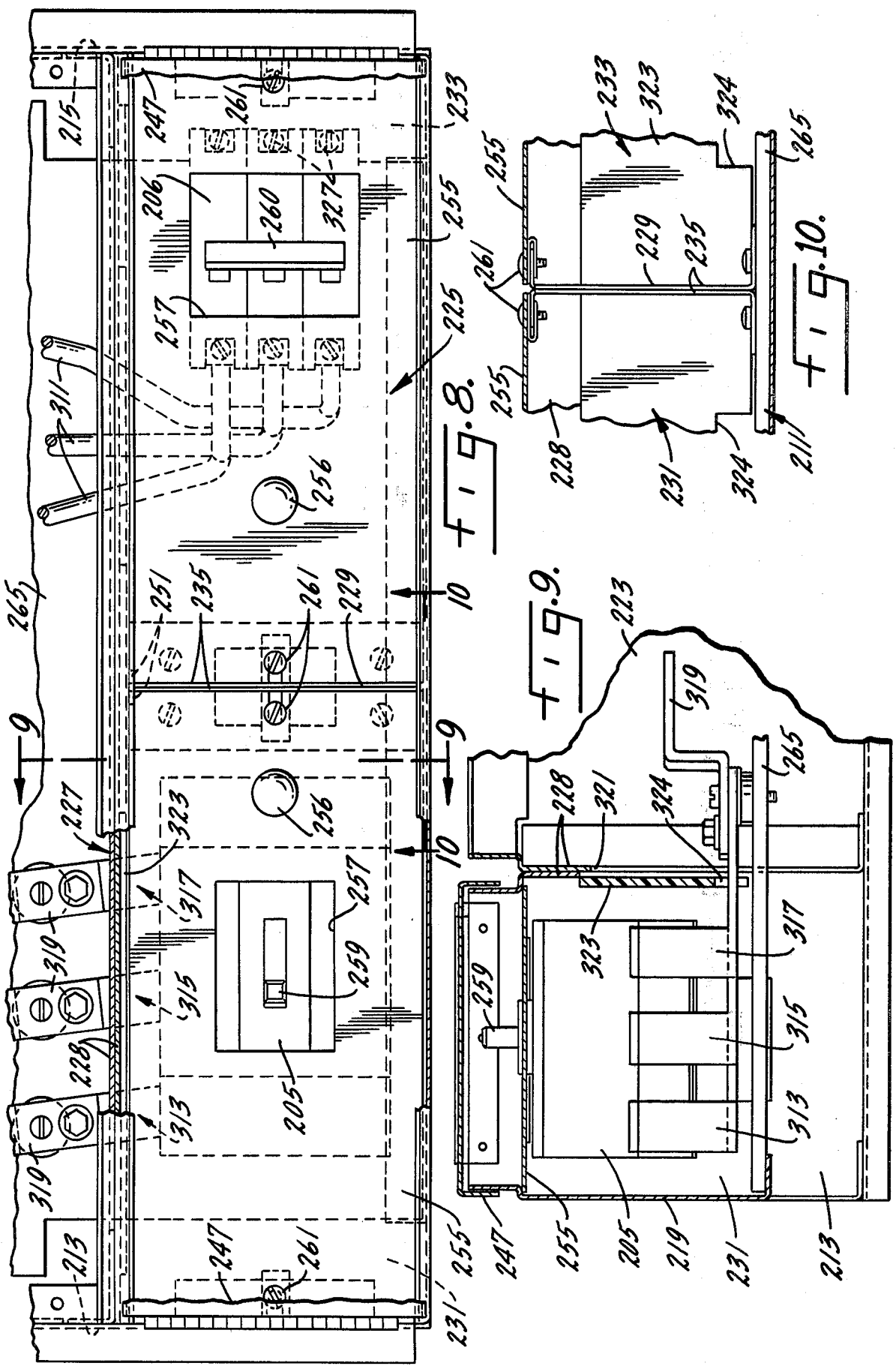

TAMPER PREVENTION HOUSING FOR A WATT-HOUR METER AND OVERLOAD PROTECTED SWITCH

CROSS REFERENCE TO RELATED APPLICATION

This is a continuation of application Ser. No. 401,848, filed July 26, 1982, now abandoned, which is a continuation-in-part of application Ser. No. 314,687, filed Oct. 26, 1981, now abandoned.

BACKGROUND OF THE INVENTION

This invention relates to a tamperproof housing assembly which encloses one or more watt-hour meters and associated overload protected switch means and which can be installed on an existing standard panelboard chassis.

Due to the ever increasing cost of electrical energy, increased emphasis has been placed on the conservation of energy. One aspect of the conservation of energy has been to increase the emphasis on accountability for users of electrical energy. This emphasis has the double purpose of making the users aware of their actual consumption of energy and to require them to actually pay for all of their consumption. In many existing large buildings and shopping centers with multiple tenants, it has not been uncommon that the individual tenants were not separately metered for the electricity they used. Instead, the tenants have often been charged for electricity on a proportional basis at a rate based on the square footage of the space they occupy.

Installing individual meters for each tenant in multiple occupancy buildings and shopping centers without completely reconstructing the electrical supply has not always been feasible. The provision of separate watt-hour meters for each tenant has also required separate switches and overload protection arrangements. The connection of these units to existing panelboard chassis containing bus bars which provide low voltage, high ampere service has presented problems. Not the least of these problems is the lack of space within the typical existing panelboard chassis to provide meter sockets closely adjacent the bus bars and the overload protection and switches which are necessarily associated with each meter socket. The public utilities generally require that the meter be located as close to the bus bars as possible and ahead of the user's switch and overload protection arrangement, to prevent theft of electricity, an ever increasing problem in these days of high energy costs.

The typical existing panelboard chassis for polyphase, low voltage, high amperage service has three bus bars that are symmetrically located relative to the center of the panelboard chassis as shown in FIGS. 3, 6 and 7 of the drawings. The typical panelboard chassis is only slightly wider than the array of these three bus bars, as is also shown in the previously mentioned drawings. Thus, a suitable tamper-prevention housing assembly must mount on the panelboard chassis without extending substantially beyond the lateral confines of the panelboard assembly. The polyphase meter sockets, which cannot be centered over the three bus bars because of space restrictions, must be connectable to the bus bars in their proper phase relation. Because of the high amperage which flows through the meter connections in this type of service, rigid bus connectors should be provided between the bus bars and the polyphase meter sockets. These rigid bus connectors must fit into the limited space between the bus bars and the polyphase meter sockets. Whether a single meter socket is provided, as shown in FIGS. 1-4 of the drawings, or a pair of meter sockets are located side-by-side, as shown in FIGS. 5-10 of the drawings, the meter sockets cannot be located directly over the bus bars but must be offset to one side of the panelboard chassis.

SUMMARY OF THE INVENTION

It is an object of the present invention, therefor, to provide a tamperproof housing assembly which can be mounted on a standard panelboard chassis and adapted to enclose one or more watt-hour meters and associated overload protected switch means, all arranged in a secure theft-preventive sequence between the bus bars located in the panelboard chassis and the terminal lugs of the wires of the output load.

A further object of the invention is a tamperproof housing assembly for one or more watt-hour meters having a separate securable compartment for the watt-hour meter with the meter compartment being located between the bus bars and the user's switch.

Another object of this invention is a compact, tamperproof housing assembly for mounting one or more watt-hour meters and associated overload protected switch means which may be installed on existing panelboard chassis in place of presently unmetered switches.

Still another object of this invention is a compact, tamperproof housing assembly for a pair of watt-hour meters and their respective overload protected switch means, mounted in a side-by-side relation, in which each switch means is located in a separately securable sub-compartment.

Accordingly, the invention relates to a tamper prevention housing assembly for mounting on a standard panelboard chassis, adapted to enclose either one or two watt-hour meters and associated overload protected switch means arranged in a secure sequence between the bus bars of the panelboard chassis and the terminal lugs for the user's output load. This housing assembly includes a rectangular housing having back, side and end walls, mountable on a panelboard chassis with its back to the chassis. A first security partition extends between two opposed walls to divide the housing into a meter compartment and at least one switch compartment with the partition having an opening formed therein. A second security partition may be provided to divide the switch compartment into two subcompartments. At least one meter socket is installed in the meter compartment, and overload protected switch means are installed in each switch compartment. A first set of bus connectors electrically connect the bus bars to the meter sockets; additional connectors electrically connect the meter sockets to the switches, these connectors extending through the opening in the security partition. A security panel, mounted from the meter compartment side, closes this opening. A removable panel closes the front of the meter compartment and this panel has at least one opening for exposing a meter to view; this panel is provided with means to permit securing it in a compartment closing position against unauthorized removal. A door is mounted on the front of the switch compartment. An opening is formed in the side wall of each switch compartment to provide access for load connections to the switch.

BRIEF DESCRIPTION OF THE DRAWINGS

FIG. 1 is a front elevation view of a tamperproof housing assembly enclosing a watt-hour meter and a fused switch, constructed in accordance with one embodiment of the invention;

FIG. 2 is a plan view of the housing assembly of FIG. 1 with some parts omitted and others shown in cross section;

FIG. 3 is a section view taken approximately along line 3—3 of FIG. 2.

FIG. 4 is an enlarged front elevation view of the housing assembly of FIG. 1 with the front panel and the door removed;

FIG. 8 is an enlarged, partial view of the lower housing assembly of FIG. 5 with parts broken away and others shown in dashed lines for clarity of illustration;

FIG. 9 is a section view taken approximately along line 9—9 of FIG. 8; and

FIG. 10 is a section view taken approximately along line 10—10 of FIG. 8.

DESCRIPTION OF THE PREFERRED EMBODIMENTS

Figure 5:
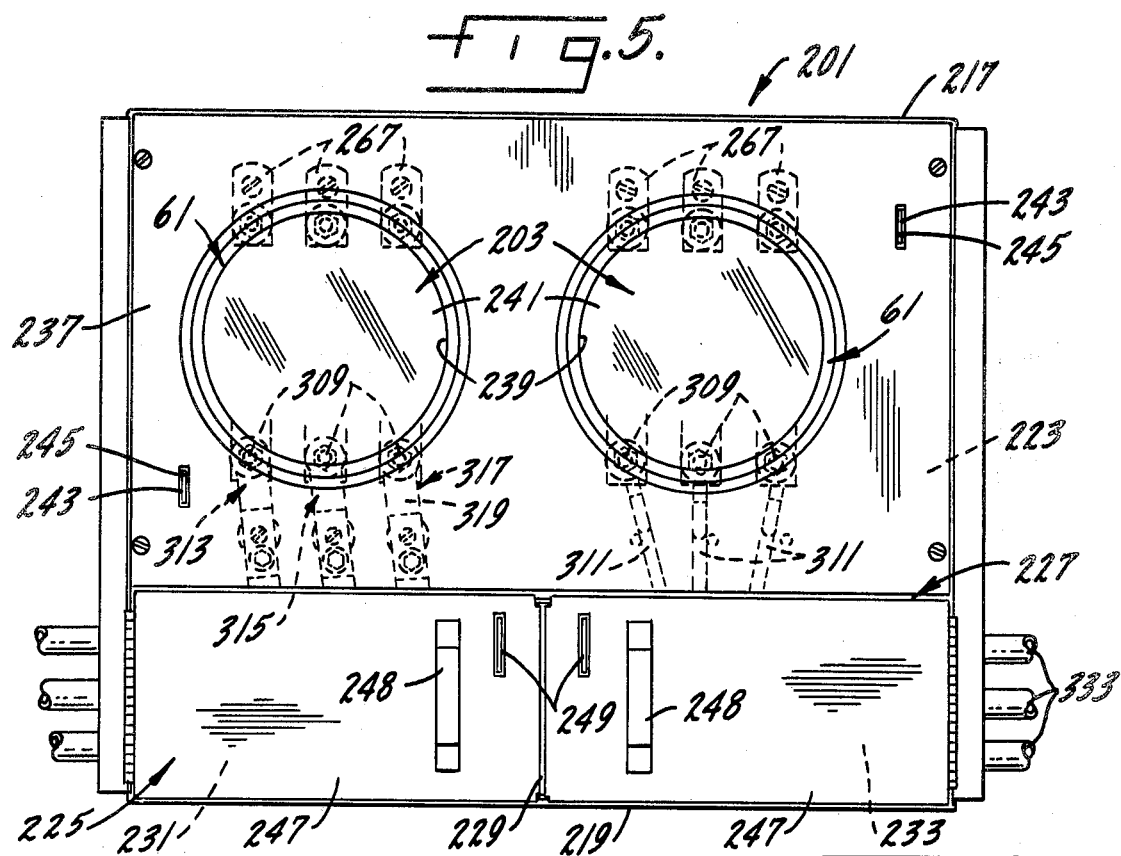
FIG. 5 is a front elevation view of a tamperproof housing assembly enclosing a pair of watt-hour meters and a pair of overload protected switch means, constructed in accordance with a second embodiment of the invention.

FIGS. 1 through 4 of the drawings illustrate one form of my invention embodied in a temperproof housing assembly 11 which encloses a watt-hour meter 13, a switch 15 and overload protection means such as fuses 17, installed on an existing standard panelboard chassis 19. The panelboard chassis, as is conventional, includes side rails 20 which are held together by crossbars 21. The housing assembly includes a back wall 22, side walls 23 and 25, and end walls 27 and 29. The main portion of the back wall is inset, forming a channel 31 which permits the housing to be mounted on the side rails 20 of a standard panelboard chassis 19 with space for electrical connections.

The housing assembly is divided into a meter compartment 35 and a switch compartment 37 by a security partition 39 which extends between the end walls 27 and 29. A removable panel 41 is provided to close the front of the meter compartment. This panel has a circular opening 43 adapted to receive a transparent watt-hour meter cover 45. Screws 47 fasten the panel 41 to the housing assembly. Eyes 49 attached to the housing extend through slots 50 in the panel 41 to provide means for locking or sealing the panel 41 in a closed position. A door 51 is hingedly connected to the housing assembly to close the front of the switch compartment 37. This door is operated by a handle 53; the handle 53 is part of a conventional switch operating mechanism (not shown) of the kind which functions to actuate the switch to its off position before releasing a latch so that the door 51 can be opened.

A meter socket 61, shown in FIG. 4 of the drawings, is mounted on a phenolic insulating board 63 which forms part of the back wall 22 of the housing assembly that closes the back of the meter compartment 35. The meter socket is intended for use with a low voltage, three phase power system and therefore has three input terminals 65. Each input terminal is connected to one of the bus bars 67, 69 and 71 by a respective one of three bus connectors 73, 75 and 77. Each bus bar is equipped with tapped holes 78 spaced along its length. These holes receive bolts 79 which attach the bus bars to the crossbars 21 of the panelboard chassis 19 by nuts which are not shown. Insulator pads 79A isolate the bus bars from the chassis. Each bus connector includes a flat rectangular strap portion 80 having an offset end 81 which fastens to the bus bar by means of a bolt 82 engaging one of the tapped holes 78, and a cylindrical post 83 which is fastened to the opposite end of the strap portion 80 by a rivet 85. Each cylindrical post 83 extends through the insulating board 63 and is connected to a terminal 65 by a lug 89. As is conventional, each bus connector is enclosed in a sheath (not shown) of a tough plastic insulating material.

The meter socket 61 is also provided with three output terminals 91, one for each phase of the power supply. A meter 13, depicted schematically in FIG. 4, fits into the meter socket. Irregularly shaped bus connectors 95, 97 and 99 connect the output terminals 91 to the switch 15 located in the switch compartment 37 adjacent the security partition 39. In low-amperage installations, cables can be used for the connectors 95, 97 and 99. The connectors 95, 97 and 99 extend through an opening 103 in the security partition which is further closed by a removable security panel 105 that is removable only from the meter compartment side. The security panel 105, when removed, permits connection of the connectors 95, 97 and 99 to the switch 15. After installation and fastening to the partition 39 with screws (not shown) on the meter compartment 35 side of the partition, the customer cannot obtain access from the switch compartment 37 to the input terminals 65, which are ahead of the meter. Thus, the security partition 39 prevents the theft of electricity. The bus connectors are each enclosed in a sheath (not shown) of an insulating plastic material. A lever 107 for operating a conventional meter bypass (not shown) is provided.

Three fuse holders 111 are positioned in the switch and fuse compartment 37 between the switch 15 and the side wall 25 of the housing assembly. The fuse holders 111 are adapted to receive miniature fuses 17 of the type manufactured by Bussmann Mfg. Div. under the class T fuse designation. Of course, it will be recognized that a circuit breaker can be substituted for the switch and fuses in compartment 37. When a circuit breaker is used, there is no handle 53 mounted on door 51. A wire connection lug 117 is located between each fuse holder and the side wall 25 of the housing assembly. Opening 119 is provided in the side wall 25 to connect to the customer's load. This opening is closed by a removable insulating panel 123 having openings 125 to receive the load conductors.

The switch 15 is provided with an operating lever 127 which is engaged by the actuating mechanism comprising the switch handle 53 mounted on the door 51.

FIGS. 5 through 10 of the drawings illustrate another form of my invention embodied in a tamperproof housing assembly 201 which encloses a pair of watt-hour meters 203 in side-by-side relation. As shown in FIG. 8, each meter has an overload protected switch means in the form of a circuit breaker 205 or 206 located immediately adjacent the meter and on the same side of the housing assembly 201 as its meter. The panelboard chassis, which is of conventional construction, is the same as is described in connection with the embodiment of FIGS. 1 through 4.

The housing assembly 201 includes a back wall 211, side walls 213 and 215, and end walls 217 and 219. The main portion of the back wall is inset, forming a channel 221 which permits the housing assembly to be mounted on the side rails 20 of a standard panelboard chassis 19 with space for electrical connectors.

The housing assembly is divided into a meter compartment 223 and a switch compartment 225 by a first security partition 227 formed of two panels 228 (FIG. 8) which extend between the side walls 213 and 215 of the housing. A second security partition 229 extends between the first security partition 227 and the end wall 219 to divide the switch compartment 225 into switch subcompartments 231 and 233. The second security partition is formed of a pair of L-shaped plates 235 which are fastened to the back wall 211 of the housing (FIGS. 8 and 10).

A removable front panel 237 is provided to close the front of the meter compartment (FIG. 5). This panel has a pair of circular openings 239 each adapted to receive a transparent watt-hour meter cover 241. Eyes 243 attached to the housing extend through slots 245 in the panel to provide means for locking or sealing the panel 237 in a closed position. Doors 247 with handles 248 are hingedly connected to the housing assembly to close the fronts of the switch subcompartments 231 and 233. Each door 247 is equipped with a spring biased latch 249 which engages a slot 251 in the first security partition 227 (see FIG. 8) to hold the door closed. Each latch is equipped with an opening (not shown) to receive the shank of a lock to secure the door in its closed position. A removable panel 225 having a lifting knob 256 is located inside each door 247 to cover the front of each subcompartment 231 and 233 (FIGS. 9 and 10). Each panel has an opening 257 formed therein through which extend the switch levers 259 and 260 of the circuit breakers 205 and 206 located in the subcompartments. Screws 261 secure each panel 255 in position.

A pair of meter sockets 61 of the same type as sockets 61, shown in FIG. 4 of the drawings, are mounted on a phenolic insulating board 265 (FIGS. 6, 8 and 10) which forms part of the back wall 211 of the housing assembly that closes the back of the meter compartment 223. A meter socket is mounted on each side of the housing so that the sockets are positioned side-by-side. The meter sockets are intended for use with a low voltage, three phase power system and therefore each has three input terminals 267 (FIG. 5). Each similar input terminal of each meter socket is connected to one of the bus bars 269, 271 and 273 (FIGS. 6 and 7) by a respective one of three bus connectors 275, 277 and 279. Each bus bar is equipped with tapped holes 281 spaced along its length. These holes receive bolts 79 (FIG. 3) which attach the bus bars to the crossbars 21 of the panelboard chassis 19 by nuts which are not shown. Insulator pads 79A isolate the bus bars from the chassis.

Figure 6:
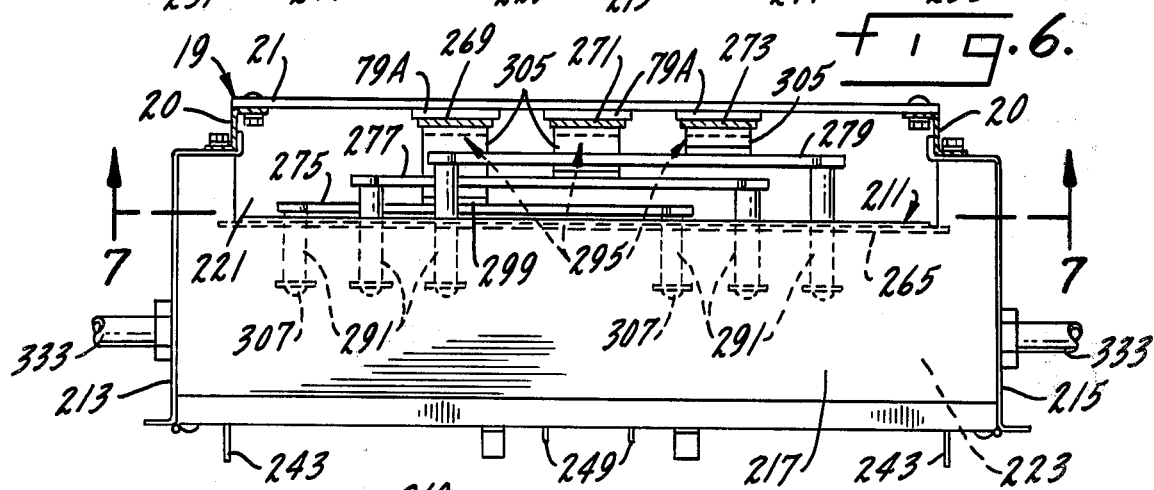
FIG. 6 is a plan view of the housing assembly of FIG. 5 with some parts shown in dashed lines.
Figure 7:
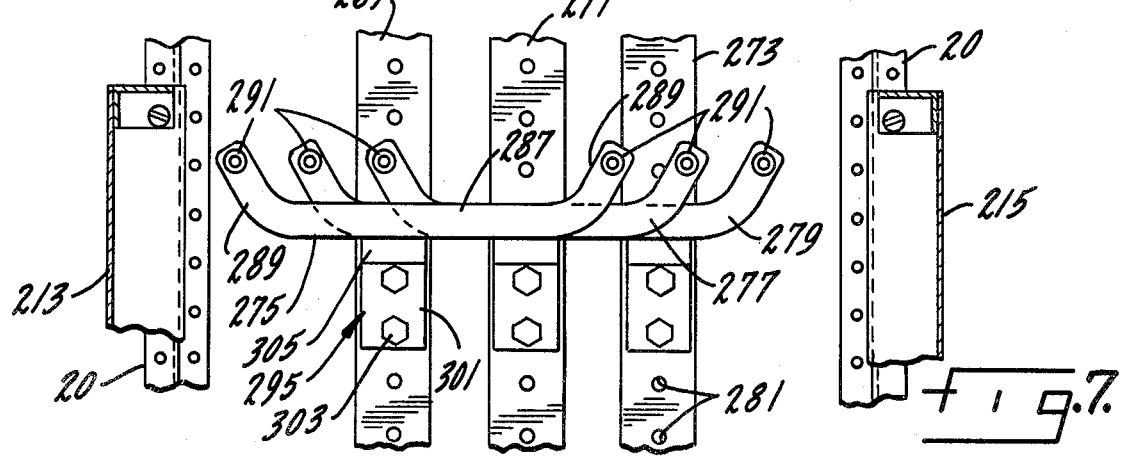
FIG. 7 is a partial sectional view taken approximately along line 7—7 of FIG. 6.

Each bus connector includes a flat strap portion 287 having turned ends 289 with a cylindrical post 291 located at each turned end (FIGS. 6 and 7). Each cylindrical post is fastened to the strap portion by a rivet (not shown). A bus bar mounting bracket 295 is attached to the strap portion of each bus connector, intermediate its turned ends, by rivets (not shown) which extend through one leg 299 of the bracket. The other leg 301 of each mounting bracket attaches to a bus bar by means of bolts 303 which engage the tapped holes 281 (FIG. 7).

To permit each bus connector to connect the same phase input terminals 267 of the two meter sockets 61 to one of the bus bars in the relatively shallow channel 221 at the back of the housing, it is necessary to nest and overlap the bus connectors 275, 277 and 279. This is accomplished by varying the lengths of the integral spacers 305 which connect the legs 299 and 301 of each bus bar mounting bracket 295 and by varying the lengths of the cylindrical posts 291 (FIGS. 6, 7). As best shown in FIG. 6, bus connector 275, which connects the A phase bus bar 269 to the A phase input terminals 267 of the meter sockets, has the longest integral spacer 305 and the shortest cylindrical posts 291. Bus connector 279, which connects the C phase bus bar 274 to the C phase input terminals 267 of the meter sockets, has the shortest integral spacer 305 and the longest cylindrical posts 291. The sum of the lengths of the integral spacers and the lengths of the cylindrical posts is the same for each of the three bus connectors. The mounting bracket 295 of each bus connector is attached to its flat strap portion 287 at a different location intermediate its turned ends 289 to permit each bus connector to be connected to one particular bus bar. Each cylindrical post 291 extends through the insulating board 265 and is connected to an input terminal 267 by a screw 307. As is conventional, each bus connector is substantially enclosed in a sheath (not shown) of a tough plastic electric insulating material.

Each meter socket is also provided with three output terminals 309, one for each phase of power supply (FIG. 5). A meter 203, depicted schematically in FIG. 5, fits into each meter socket. In low-amperage installations, cables 311 can be used to connect the output terminals 309 to the circuit breaker 206 located in subcompartment 233 on the right hand side of the housing assembly 201 as viewed in the drawings. In high-amperage installations, bus connectors 313, 315 and 317 connect the output terminals 309 to the circuit breaker 205 located in subcompartment 231 on the left hand side of the housing assembly 201 as viewed in the drawings.

To facilitate removability of the meter sockets 61, each of the output bus connectors 313, 315 and 317 may be provided with a removable link 319 which is bolted to the output terminals 309 and to the bus connector.

The cables 311 and the bus connectors 313, 315 and 317 extend through an opening 321 in the first security partition 227 which is further closed by a removable security panel 323 that has conductor slots 324 and is removable only from the meter compartment side; see FIGS. 8 and 9. When the security panel 323 is removed, the cables 311 and the bus connectors 313, 315 and 317 may be connected to their respective circuit breakers 205 and 206 in subcompartments 233 and 231, respectively (FIGS. 5 and 8). After installation and fastening of security panel 323 to the first security partition 227 with screws (not shown) accessible only on the meter compartment 223 side, the customers cannot obtain access from the switch subcompartments 231 and 233 to the input terminals 267, which are ahead of the meters. Thus, the first security partition 227 prevents the theft of electricity. A lever 107 as shown in FIG. 4 is provided for each meter socket 61 for operating a conventional meter bypass (not shown).

Each circuit breaker 205 and 206 is provided with connection lugs 327 (shown only on circuit breaker 206, FIG. 8) adjacent the side walls 213 and 215 of the housing assembly. Suitable openings are provided in side walls 213 and 215 to connect to the customer's load, each opening being closed by a removable insulating panel having corresponding openings to receive the load lines 333, as generally indicated in FIGS. 5 and 6.

The housing assemblies 11 and 201 heretofore described can be installed on existing panelboard chassis which have been used to provide unmetered electrical service to individual tenants. The housing assemblies comply with the rules of electric utility companies which require the elements to be arranged in the sequence of meter, switch and fuses between the source of power and the individual customer's load. The meter or meters are located in a separate compartment which can be locked or sealed independently of access to the overload protected switch compartment, thereby providing a tamperproof environment and a safeguard against theft of electricity.

Although the invention has been shown and described for use with a low voltage, three phase power supply, it should be appreciated that it is also adaptable to other types of power supplies.

I claim:

1. A tamper prevention housing assembly mounted on a standard polyphase panelboard chassis which contains at least three rigid bus bars extending the length of the panelboard chassis and approximately symmetrically spaced across the width of the chassis and occupying substantially all of the width of the chassis, the housing assembly being adapted to enclose a polyphase watt-hour meter and overload protected polyphase switch means arranged in a secure sequence between the bus bars of the panelboard chassis and the terminal lugs for the output load, in which the housing assembly does not extend substantially beyond the lateral confines of the panelboard chassis, the housing assembly including:
   a rectangular housing having back, side and end walls, the housing being mounted on the panelboard chassis with its back to the chassis,
   a security partition extending between two opposed walls of the housing to divide the housing into a meter compartment and a switch compartment,
   a polyphase meter socket installed in the meter compartment in asymmetrical alignment relative to the bus bars,
   an overload protected polyphase switch means installed in the switch compartment,
   a first set of rigid connectors, one for each bus bar, individually electrically connecting the bus bars of the chassis to the meter socket,
   each connector of the first set having a different length to connect the bus bars to the meter socket in proper phase relation in its asymmetrical position relative to the bus bars,
   a second set of connectors, extending through the first security partition and individually electrically connecting each phase from the meter socket to the switch means,
   a removable panel closing the front of the meter compartment and having at least one opening for exposing a meter to view, the removable panel having means to permit securing it in a compartment-closing position against unauthorized displacement or removal,
   a hinged door mounted on the front of the switch compartment, and
   at least one opening formed in a side wall of the switch compartment to afford access for load connections to the switch means.

2. A tamper prevention housing assembly mounted on a standard polyphase panelboard chassis which contains at least three rigid bus bars extending the length of the chassis and approximately symmetrically spaced across the width of the chassis, the housing assembly being adapted to enclose a pair of polyphase watt-hour meters and a pair of overload protected polyphase switch means arranged in a secure sequence between the bus bars of the panelboard chassis and the terminal lugs for the output loads, in which the housing does not extend substantially beyond the lateral confines of the panelboard chassis, the housing assembly including:
   a rectangular housing having back, side and end walls, the housing being mounted on the panelboard chassis with its back to the chassis,
   a first security partition extending between two opposed walls of the housing to divide the housing into a meter compartment and a switch compartment,
   a pair of polyphase meter sockets installed in the meter compartment with each meter socket being positioned on an opposite side of the housing and located asymmetrically relative to the bus bars,
   a pair of overload protected polyphase switch means installed in the switch compartment,
   a first set of connectors, one for each bus bar, individually electrically connecting one of the bus bars to each of the two meter sockets in the same phase relation for each meter socket,
   each connector of the first set of connectors having a different length to connect the bus bars to the meter sockets in proper phase relationship in their off center positions,
   each connector of the first set of connectors having an elongated flat strap portion, an upstanding post portion located at opposite ends of the strap portion, and a bus bar mounting bracket attached to the strap portion intermediate the ends thereof, each post portion positioned to be connected to one of the two meter sockets,
   the post portions of the bus connectors of the first set of connectors being of different lengths so that the strap portion of each bus connector of the first set of connectors is positioned a different distance from the meter sockets,
   second sets of connectors, each set extending through the first security partition and individually electrically connecting each phase of a meter socket to its switch means,
   a removable panel closing the front of the meter compartment and having two openings for exposing the meters to view, the removable panel having means to permit securing it in a compartment-closing position against unauthorized displacement or removal,
   a hinged door mounted on the front of the switch compartment, and
   at least one opening formed in each side wall of the switch compartment to afford access for the load connections to the switch means.

3. The tamper prevention housing of claim 2 in which the post portions of the bus connectors of the first set are of different lengths so that the strap portion of each connector of the first set is positioned a different distance from the meter sockets.

4. The housing assembly of claim 3 in which each bus bar mounting bracket of the first set of connectors is of a different length and the sum of the length of the mounting bracket and the length of the post portion for each connector of the first set of connectors is the same.

* * * * *